United States Patent [19]

Suzuki

[11] Patent Number: 5,140,672
[45] Date of Patent: Aug. 18, 1992

[54] DIAGRAM GENERATOR HAVING REFERENCE TABLE WHICH INCLUDED REPRODUCING AND NAME ASSIGNING UNITS FOR EXPANDING CIRCUIT FROM LOWER TO HIGHER LEVEL

[75] Inventor: Shigenobu Suzuki, Tokyo, Japan

[73] Assignee: NEC Corporation, Tokyo, Japan

[21] Appl. No.: 313,500

[22] Filed: Feb. 22, 1989

[30] Foreign Application Priority Data

Feb. 23, 1988 [JP] Japan .................................. 63-40406

[51] Int. Cl.⁵ ............................................. G06F 15/60
[52] U.S. Cl. .............................. 395/100; 364/DIG. 1;
364/237.5; 364/275.6; 364/560
[58] Field of Search ......... 364/518, 560, 200 MS File,
364/900 MS File; 395/100

[56] References Cited

U.S. PATENT DOCUMENTS

| 4,864,520 | 9/1989 | Setoguchi et al. | 364/560 |
| 4,868,766 | 9/1989 | Oosterholt | 395/120 |
| 4,933,865 | 6/1990 | Yamamoto et al. | 364/518 |

OTHER PUBLICATIONS

Lacy; "Using a CAD/CAE System for Flexible Circuit Design"; Electronic Manufacturing; vol. 34 No. 3 Mar. 1988, pp. 35-36.
Ishii et al. "An Automatic Input System of logic Circuit Diagram for CAD"; Int. Conf. on Computer Aided Design and System (Jul. 3-6, 1979), pp. 123-126.

Primary Examiner—Thomas C. Lee
Assistant Examiner—Krisna Lim
Attorney, Agent, or Firm—Foley & Lardner

[57] ABSTRACT

An expansive circuit diagram information generator for use with computer aided design (CAD) systems to generate expansive circuit diagrams from a hierarchical circuit diagram. The expansion method makes the expanded circuit diagram more easily readable for its user. The circuit diagram generator consists of the following: An input for the hierarchical circuit diagram composed of high level circuits and low level circuit references; A reproducing unit to insert circuits into the lower level circuit references from a table of standard circuits; A name changing unit to make unique the names between the lower level circuit diagrams which the reproducing unit made identical by referencing two identical circuits from the standards table; and an interface symbol changing unit for replacing links between higher level circuit diagrams and lower level circuit diagrams with jump tags.

3 Claims, 5 Drawing Sheets

DIAGRAM GENERATOR HAVING REFERENCE TABLE WHICH INCLUDED REPRODUCING AND NAME ASSIGNING UNITS FOR EXPANDING CIRCUIT FROM LOWER TO HIGHER LEVEL

BACKGROUND OF THE INVENTION

The present invention relates to an expansive circuit diagram information generator for use in a computer system to generate expansive circuit diagram information from hierarchical circuit diagram information.

Some of the computer-aided design (CAD) systems, which perform logical simulation, timing verification, layout, and so forth, on the basis of circuit diagram information, can process only expansive circuit diagram information. In response to hierarchical circuit diagram information stated at a higher level referencing circuit diagram information at a lower level therein, a CAD system converts the hierarchical circuit diagram information into expansive circuit diagram information for processing. Therefore, the CAD system extracts logical data from the hierarchical circuit diagram, expands the extracted logical data, develops a circuit diagram for the expanded logical data, and thereby generates expansive circuit diagram information.

For information on such a method to generate circuit diagrams, reference may be made to Anjali Arya et al., "Automatic Generation of Digital System Schematic Diagrams" in IEEE, 22nd ACM/IEEE Design Automation Conference, 1985, pp. 388-395.

The hierarchical expansion method is intended to generate a circuit diagram in a form as highly readable as possible for its user. However, the circuit diagram thereby generated has a different image from the circuit diagram indicated by the original hierarchical circuit diagram information, and is not sufficiently readable for the user. Especially where circuit diagram information at a lower level of hierarchy which the circuit diagram at a higher level of hierarchy is to reference has a relatively large quantity, the circuit diagram indicated by the expansive circuit diagram information becomes so large that the diagram has to be, split to be displayed. As a result, the user finds it difficult to take an overall look at the diagram.

SUMMARY OF THE INVENTION

An object of the present invention is, therefore, to provide an expansive circuit diagram information generator cleared of the above disadvantage.

According to one aspect of the invention, an expansive circuit diagram information generator includes an input unit for inputting hierarchical circuit diagram information, a reproducing unit for reproducing circuit diagram information for which a plurality of pieces are referred to by circuit diagram information at a higher level in of the input hierarchical circuit diagram a name changing unit for making the unique interface signal and symbol names made identical by the reproducing unit, and an interface symbol changing unit for replacing links between the higher and lower hierarchical levels of the hierarchical circuit diagram with jump tag links, and thereby generating expansive circuit diagram information.

The reproducing unit reproduces only as many pieces of the circuit diagram information other than the highest level of hierarchy as to be used. The name changing unit makes identical interface signal names unique signal names and symbol names. The interface symbol changing unit generates expansive circuit diagram information by replacing links between the upper and lower levels of hierarchy with jump tag links.

BRIEF DESCRIPTION OF THE DRAWINGS

Features and advantages of the present invention will become more apparent when taken in conjunction with the accompanying drawings, wherein.

In the figures, the same reference numerals denote respectively the same structural elements.

DETAILED DESCRIPTION OF THE PREFERRED EMBODIMENT

Figure 1:
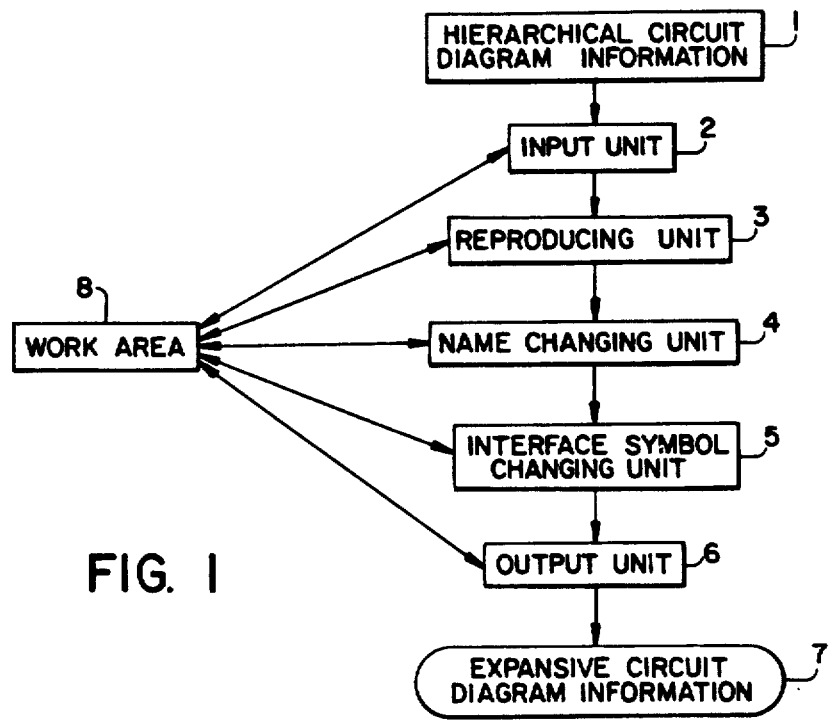
FIG. 1 is a diagram illustrating the configuration of a preferred embodiment of the invention.

Referring to FIG. 1, a preferred embodiment of the present invention comprises an input unit 2 for receiving the hierarchical circuit diagram information 1 and storing it into a work area 8; a reproducing unit 3 for reading out the hierarchical circuit diagram information from the work area 8, into which it was stored by the input unit 2, reproducing, out of the information read out, the same circuit diagram information of which a plurality of pieces are to be referenced, and storing the reproduced information into the work area 8; name changing unit 4 for processing the changing of signal names and symbol names to make the names unique in all the circuit diagram information, making identical to each other the interface signal names positioned between different levels of hierarchy, and storing the results of the processing into the work area 8; interface symbol changing unit 5 for reading out of the work area 8 the results of changing by the name changing unit 4, eliminating such symbols in circuit diagram information at a higher level in hierarchy as reference circuit diagram information at a lower level in hierarchy, processing the replacement of eliminated input/output terminals with jump tags marked with Δ, further replacing connectors between different levels of hierarchy in the circuit diagram information at the lower level of hierarchy with jump tags, and storing the results of the processing into the work area 8; and output unit 6 for reading out of the work area 8 and outputting expansive circuit diagram information 7, generated by the interface symbol changing unit 5 and having a form in which the hierarchy is expanded. The reproducing means so reproduces circuit diagram information as to equalize the number of pieces of the circuit diagram information stored in the work area 8 and plurally referenced to the number of the used pieces referenced.

Next will be described in detail the operation of the preferred embodiment of the present invention.

Figure 2:
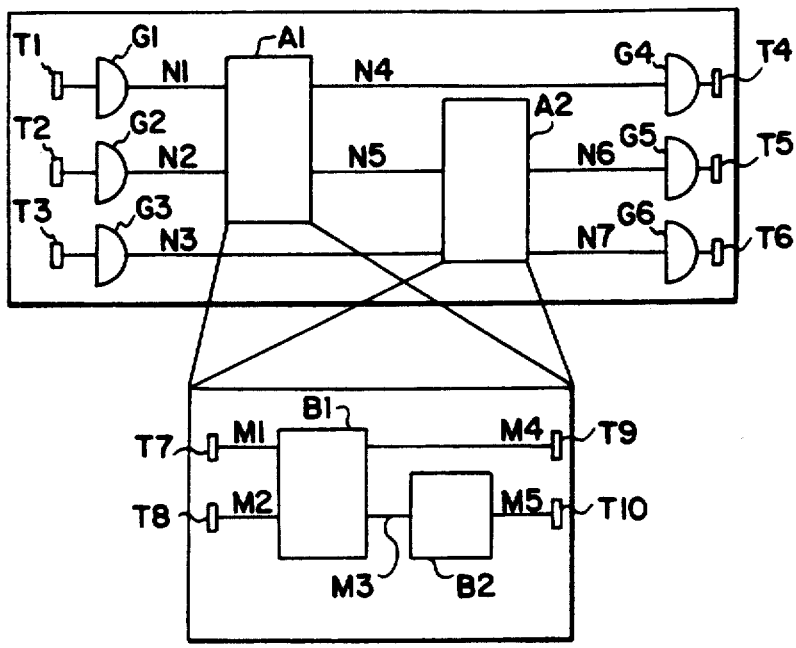
FIG. 2 is a diagram illustrating hierarchical circuit diagram information 1 shown in FIG. 1.

In the operation of the preferred embodiment of the invention, hierarchical circuit diagram information corresponding to the circuit diagram of FIG. 2 is input Referring now to FIG. 2, circuit diagram information at the highest level of hierarchy corresponding to the upper circuit diagram includes positional information indicating the arranged positions of symbols having names G1 to G6, T1 to T6, A1 and A2, connection information indicating how the symbols are connected to one another, wiring positional information indicating wiring positions, names N1 to N7 of input/output signals of the symbols, and designation of pieces of circuit diagram information of a lower level of hierarchy, such as diagram numbers, referenced by symbols having the names A1 and A2.

Circuit diagram information at a lower level of hierarchy corresponding to the lower circuit diagram includes positional information indicating the arranged positions of symbols having names T7 to T10, B1 and B2, connection information indicating how the symbols are connected to one another, names M1 to M5 of input/output signals of symbols having names B1 and B2, and wiring positional information indicating wiring positions.

In FIG. 2, the symbols denoted by names T1 to T10 represent connectors; those denoted by names G1 to G6, gate circuits; those denoted by names A1 and A2, functional blocks, and those denoted by names B1 and B2, circuits for realizing the functional blocks A1 and A2.

Figure 6:
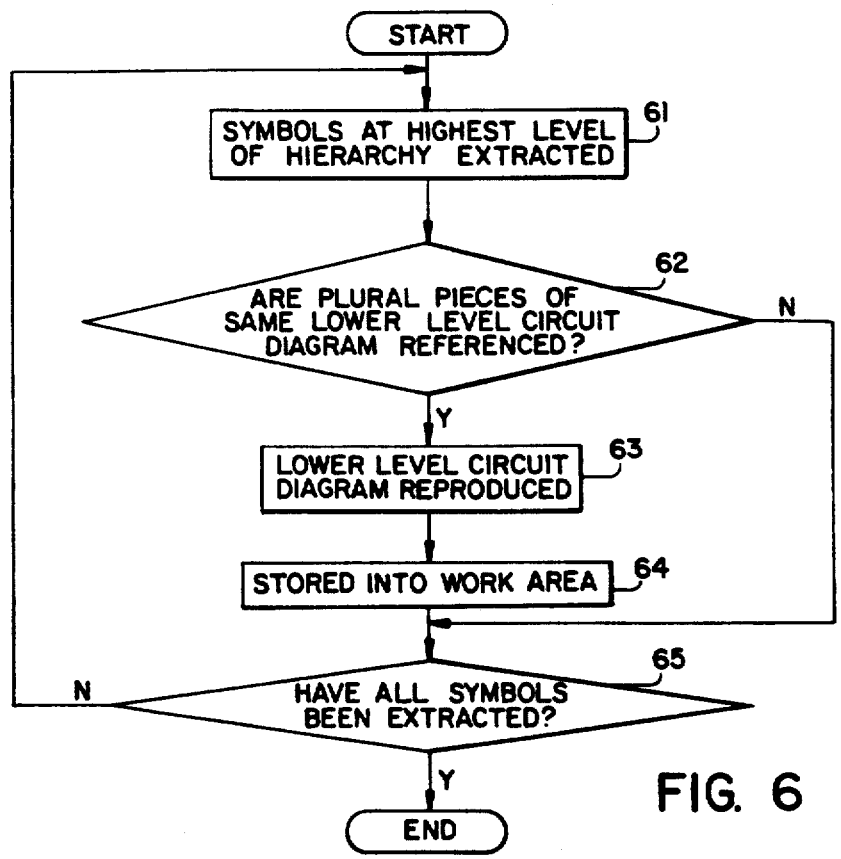
FIG. 6 is a diagram illustrating the processing flow of the reproducing means 3 shown in FIG. 1.

Referring to FIGS. 1, 2 and 6 together, the hierarchical circuit diagram information 1 corresponding to the circuit diagram shown in FIG. 2 is entered into the input unit 2, which stores the information 1 into the work area 8, and hands over the control to the reproducing unit 3. Responding to this handover of the control, the reproducing unit 3 reads out the hierarchical circuit diagram information from the work area 8, and extracts symbols at the highest level of hierarchy (step 61). Then, the reproducing unit judges whether or not the extracted symbols of the highest level of hierarchy reference a plurality of pieces in the same circuit diagram information at a lower level of hierarchy (step 62). If a plurality of pieces of the information are judged to be referenced at this step 62, the reproducing means 3 reproduces the referenced circuit diagram information at the lower level of hierarchy (step 63), and stores it into the work area 8 (step 64). These actions of the reproducing unit 3 make the number of circuit diagram information pieces at the lower level of hierarchy to be referenced and stored into the work area 8 equal to that of the number of information pieces referenced by the circuit diagram information at the higher level of hierarchy. After that, the reproducing unit hands over the control to the name changing unit 4. If it is judged, at step 62, that a plurality of information are not referenced, the reproducing unit 3 immediately hands over the control to the name changing unit 4. Since, in this example, the symbols denoted by names A1 and A2 in the circuit diagram information at the highest level of hierarchy reference the same circuit diagram information at the lower level of hierarchy, the reproducing unit reproduces the circuit diagram information at the lower level of hierarchy and stores it into the work area 8. This processing makes the image of the circuit diagram indicated by the hierarchical circuit diagram information stored into the work area 8 as illustrated in FIG. 3.

Figure 3:
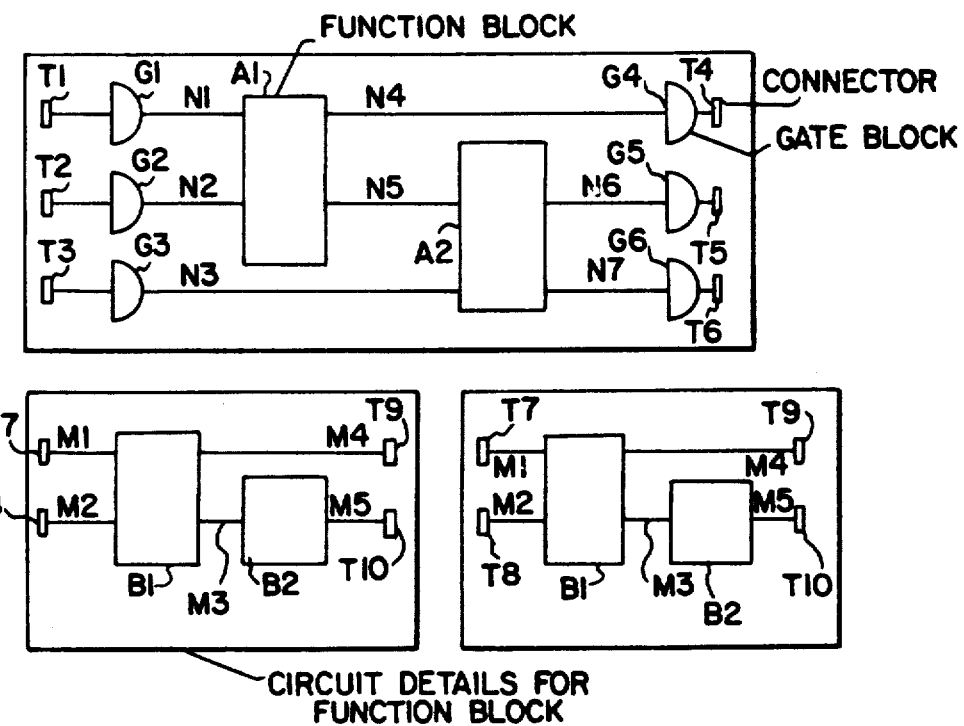
FIG. 3 is a diagram illustrating hierarchical circuit diagram information after having been processed by reproducing means 3 shown in FIG. 1.
Figure 4:
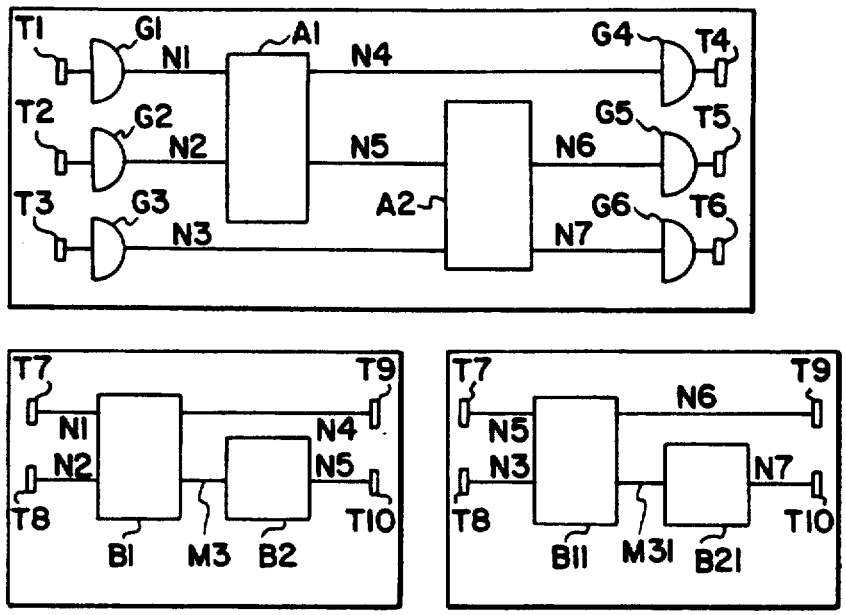
FIG. 4 is a diagram illustrating hierarchical circuit diagram information after having been processed by name changing means 4 shown in FIG. 1.

Referring now to FIGS. 1, 3, 4 and 7 together, in response to the handover of the control from the reproducing unit 3, the name changing unit 4 reads out the contents of the work area 8, performs the processing to make signal names and symbol names in the circuit diagram reproduced by the reproducing unit 3 unique in the whole circuit diagram (steps 71 to 77) and that to make identical the interface signal names positioned between different levels of hierarchy (steps 78 to 7A), and stores the processing results into the work area 8. The image of the circuit diagram indicated by the stored hierarchical circuit diagram information is shown in FIG. 4.

Referring to FIG. 3, as there are two each of symbol names B1 and B2 and signal name M3, they are changed into B11, B21 and M31, respectively, in one part of FIG. 4. Further, as signal names M1, M2, M4 and M5 in the bottom left part of the circuit diagram of FIG. 3 respectively correspond to signal names N1, N2, N4 and N5 in the part corresponding to the circuit diagram information at the higher level of hierarchy, they are replaced with signal names N1, N2, N4 and N5 in FIG. 4. Signal names M1, M2, M4 and M5 in the bottom right part of the circuit diagram of FIG. 3 respectively correspond to signal names N5, N3, N6 and N7 in the part corresponding to the circuit diagram information at the higher level of hierarchy, so that they are replaced with signal names N5, N3, N6 and N7 in FIG. 4.

Figure 5:
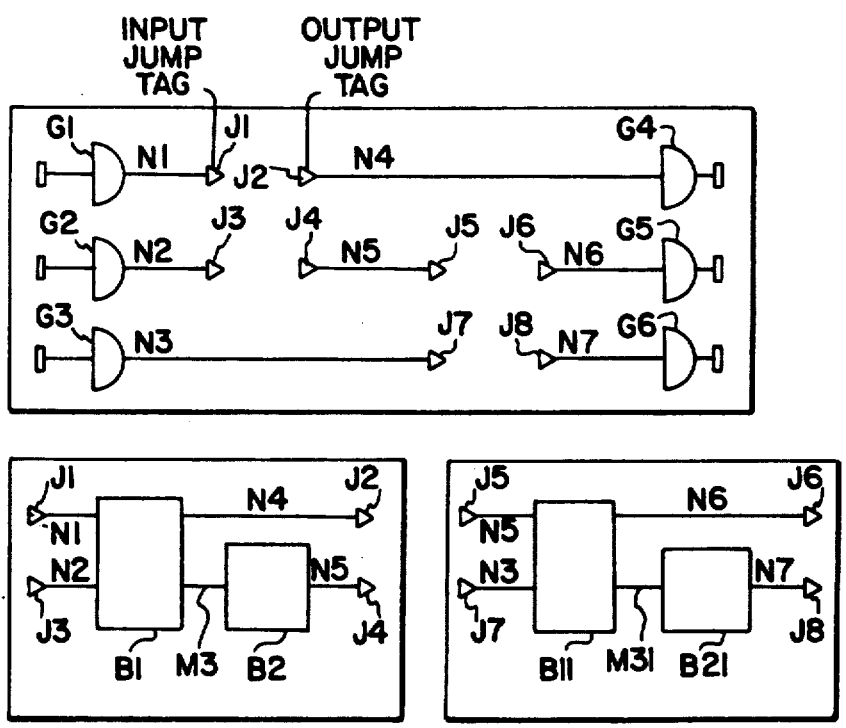
FIG. 5 is a diagram illustrating expansive circuit diagram information after having been processed by interface symbol changing means 5 shown in FIG. 1.
Figure 7:
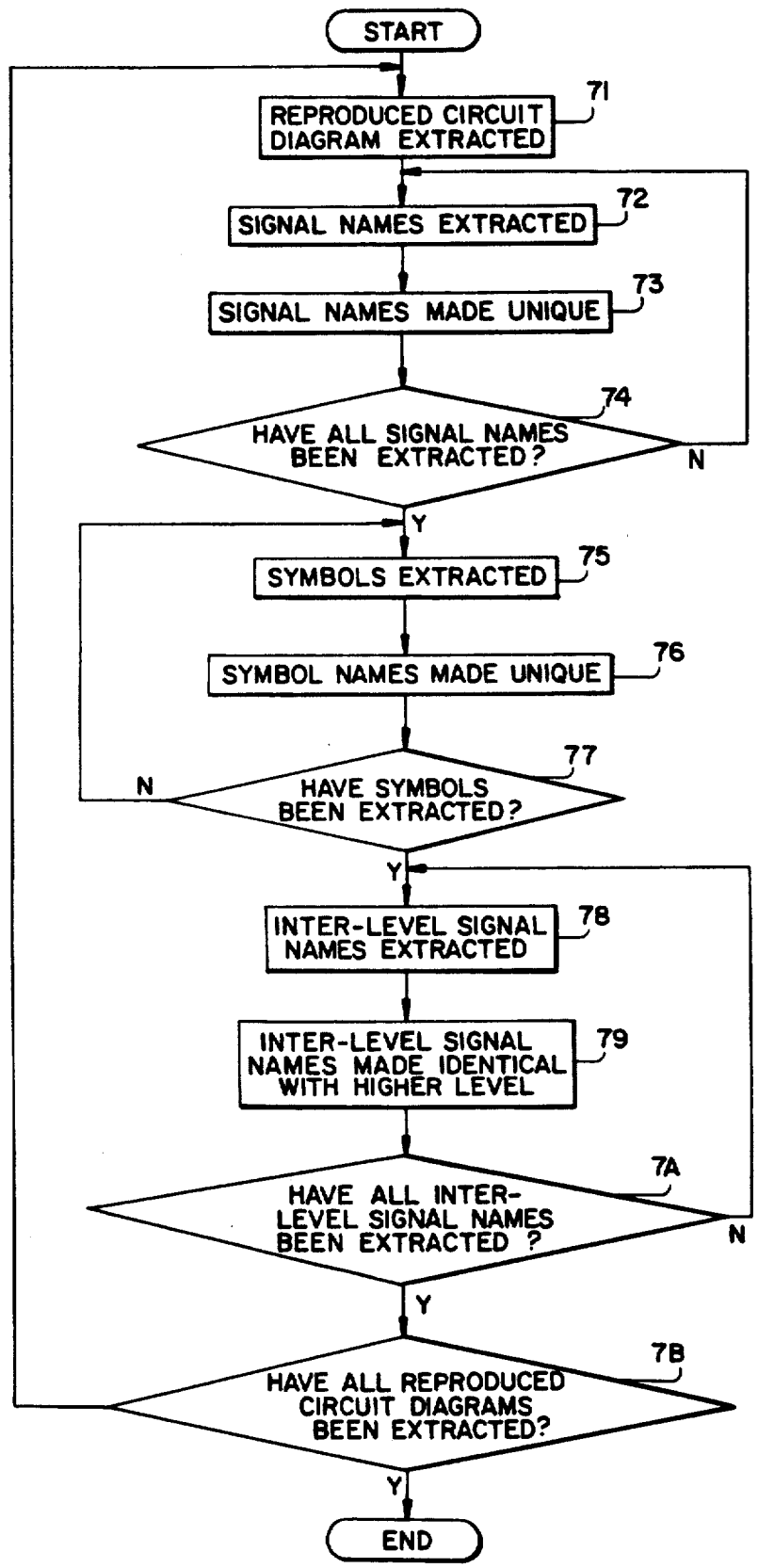
FIG. 7 is a diagram illustrating the processing flow of the name changing means 4 shown in FIG. 1.
Figure 8:
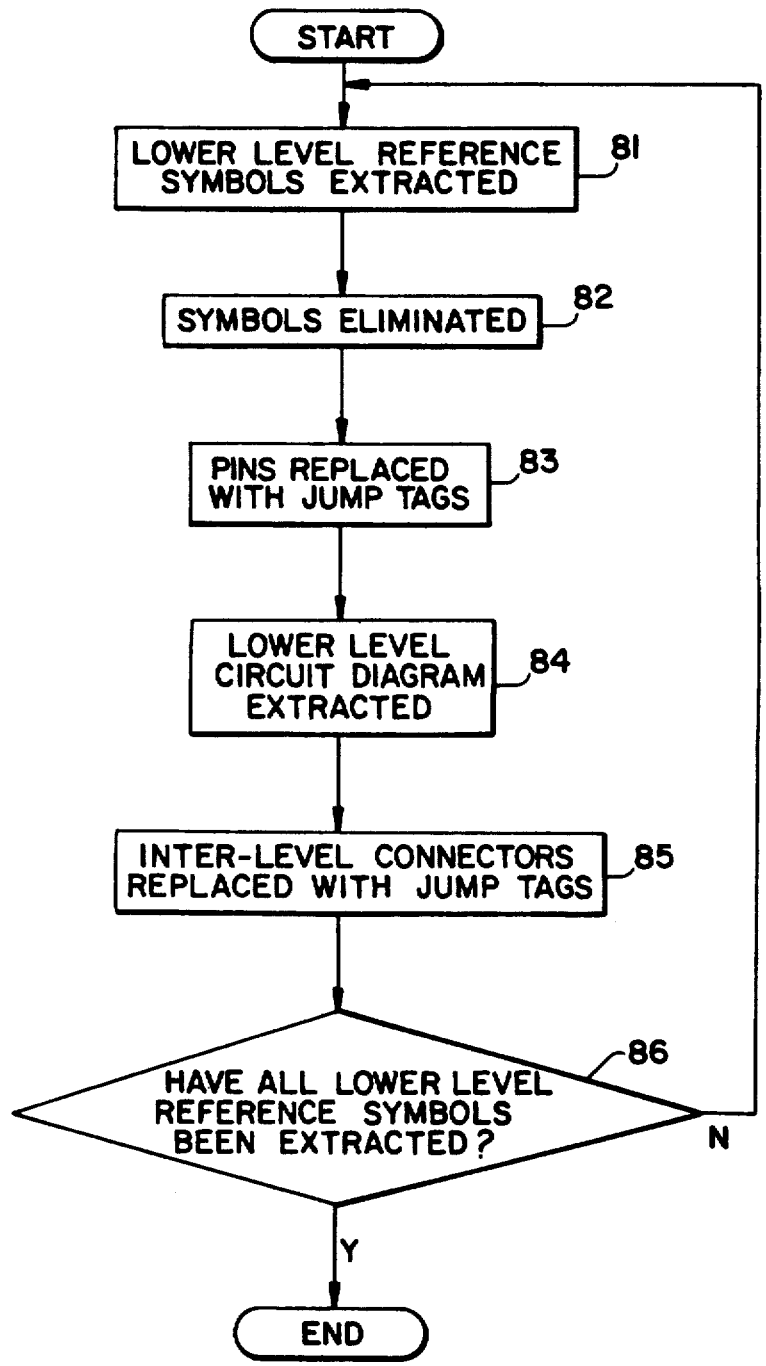
FIG. 8 is a diagram illustrating the processing flow of the interface symbol changing means 5 shown in FIG. 1.

Referring now to FIGS. 1, 5 and 8 together, responding to the handover of the control from the name changing unit 4, the interface symbol changing unit 5 reads out the contents of the work area 8, eliminates such symbols of the circuit diagram information at the higher level of hierarchy as reference the circuit diagram information at the lower level of hierarchy (steps 81 and 82), generates expansive circuit diagram information by performing the processing to replace the input/output terminals of the symbol with jump tags (step 83) and that to replace the inter-level connectors in the circuit diagram information at the lower level of hierarchy with jump tags (steps 84 and 85), and stores the expansive circuit diagram information thereby generated into the work area 8. In this example, as the symbols represented by names A1 and A2 reference the circuit diagram information at the lower level of hierarchy, the circuit diagram indicated by the circuit diagram information generated by this processing is as shown in FIG. 5.

Referring to FIG. 5, the symbols represented by names A1 and A2 are eliminated, and the input/output terminals of the symbols are replaced with jump tags J1 to J8. Then, the inter-level connectors T7, T8, T9 and T10 in the bottom left part of the circuit diagram are replaced with jump tags J1, J3, J2 and J4, respectively, and the inter-level connectors T7, T8, T9 and T10 in the bottom right part of the circuit diagram are replaced with jump tags J5, J7, J6 and J8, respectively.

Referring now to FIGS. 1 and 5 together, the interface symbol changing unit 5 later hands over the control to the output unit 6. In response to this handover of the control, the output means 6 reads out the contents of the work area 8, and outputs the expansive circuit diagram information 7 shown in FIG. 5.

A feature of the present invention comprises the generation of expansive circuit diagram information by partial modification of hierarchical circuit diagram information. This feature makes it possible to substantially equalize the image of the circuit diagram indicated by the generated expansive circuit diagram information to that of the circuit diagram indicated by the original hierarchical circuit diagram information, and thereby makes the resultant circuit diagram highly readable.

What is claimed is:

1. An expansive circuit diagram information generator for a computer comprising:
   input means for inputting hierarchical circuit diagram information including (1) a first, higher level of information including at least one functional block and a plurality of additional non-functional block circuit diagram data, and (2) a second, lower level of information including circuit elements configured in a circuit and forming said at least one functional block of said higher level of information;
   reproducing means for reproducing circuit diagram information for which a plurality of pieces of information are referred to by circuit diagram information in said hierarchical circuit diagram information;
   name changing means for generating unique interface signal names and symbol names and assigning said names to identical circuit diagram information reproduced by said reproducing means;
   interface symbol changing means for replacing connection information between higher and lower hierarchical levels of said hierarchical circuit diagram information with jump tag links ; and
   an interface symbol name changing unit for replacing names between connected ones of said high and low level circuits with names in common.

2. A circuit diagram generator for a computer, comprising:
   (a) an input unit for inputting hierarchical circuit diagram information composed of high level circuit references and low level circuit references, said low level circuit references each referencing a standard low level circuit from a table of standard circuits;
   (b) a reproduction unit for reproducing each of said low level circuit references with a respective said low level circuit from said table of standard circuits, wherein said reproduction unit judges whether two or more of said low level circuit references reference an identical said low level circuit from said table of standard circuits; and
   (c) name assigning means for assigning a unique name to each said low level circuit reproduced by said reproducing unit, comprising a name changing unit for changing each said unique name in said low level circuits judged to be identical by said reproduction unit.

3. A circuit diagram generator for a computer as recited in claim 2, further comprising an output unit, responsive to said name assigning means, for outputting expansive circuit diagram information.

* * * * *